US007895538B2

(12) United States Patent
Hutton et al.

(10) Patent No.: US 7,895,538 B2
(45) Date of Patent: Feb. 22, 2011

(54) SYSTEM AND METHOD FOR PROVIDING A COMMON INSTRUCTION TABLE (75) Inventors: David S. Hutton, Tallahassee, FL (US); James J. Bonanno, Wappingers Falls, NY (US); Michael P. Mullen, Poughkeepsie, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/033,974

(22) Filed: Feb. 20, 2008

(65) Prior Publication Data

US 2009/0210387 A1 Aug. 20, 2009

(51) Int. Cl.
*G06F 17/50* (2006.01)
(52) U.S. Cl. .......................................... 716/1; 712/209
(58) Field of Classification Search ..................... 716/1; 712/209
See application file for complete search history.

(56) References Cited

U.S. PATENT DOCUMENTS

| | | | | |
|---|---|---|---|---|
| 5,333,316 | A * | 7/1994 | Champagne et al. ............... | 1/1 |
| 5,966,707 | A * | 10/1999 | Van Huben et al. ................ | 1/1 |
| 5,983,277 | A * | 11/1999 | Heile et al. ................. | 709/232 |
| 6,178,495 | B1 * | 1/2001 | Slegel et al. ................. | 712/209 |
| 6,327,594 | B1 * | 12/2001 | Van Huben et al. ................. | 1/1 |
| 6,523,027 | B1 * | 2/2003 | Underwood ......................... | 1/1 |
| 6,654,747 | B1 * | 11/2003 | Van Huben et al. ................. | 1/1 |
| 6,708,313 | B2 * | 3/2004 | Pfeil et al. ...................... | 716/1 |
| 6,834,276 | B1 * | 12/2004 | Jensen et al. ........................ | 1/1 |
| 6,973,630 | B1 | 12/2005 | Dao et al. | |
| 7,020,697 | B1 * | 3/2006 | Goodman et al. ........... | 709/223 |
| 7,069,421 | B1 | 6/2006 | Yates, Jr. et al. | |
| 7,546,571 | B2 * | 6/2009 | Mankin et al. ................. | 716/15 |
| 2005/0278670 | A1 * | 12/2005 | Brooks et al. .................. | 716/5 |

OTHER PUBLICATIONS

"IBM® z/Architecture Principles of Operation", Publication No. SA22-7832-05, 6th Edition, Apr. 2007. 1,215 pages separated into 4 electronic attachments.

\* cited by examiner

*Primary Examiner*—Naum B Levin
(74) *Attorney, Agent, or Firm*—Cantor Colburn LLP; John Campbell (57) ABSTRACT

A system includes a storage device including a human readable common instruction table (CIT) stored as a text file. The system also includes CIT access software for performing a method including receiving a request from a first user for all or a subset of the CIT table relating to logic design and for providing the requested data to the first user. The method also includes receiving a request from a second user is received for all or a subset of the CIT table relating to performance analysis and for providing the requested data to the second user. A request is received from a third user for all or a subset of the CIT data relating to design verification and the requested data is provided to the third user.

18 Claims, 5 Drawing Sheets

```
# COMMON INSTRUCTION TABLE
# Information about the table — how to update, format, etc.

# ******* MAINLINE TABLE *********
# Column Definitions
# OPC      col0:   opcode sorted in alphabetical order
# NMEN     col1:   Mnemonic
# VA       col2:   variant, a varient is constructed for each significantly
#                       unique behavior per instruction
# VARSEL   col3:   variant selection code representing conditions that identify this variant
#                       for selection
# CLA      col4:   class (MCD=millicode, B=hardware)
# FMT      col5:   instruction format
# UNIT     col6:   unit in which instruction is executed
# BRCD     col7:   branch code
# IA       col8:   requires its own instruction address for address generation (Y/N)
# A1       col9:   first storage operand action (e.g., F=fetch, S=store only)
# A2       col10:  second storage operand action
# P1       col11:  first storage operand pattern (0,special=SPC)
# P2       col12:  second storage operand pattern
# B1       col13:  first storage operand DEPS(AGEN),1st itext field required for AGEN
# X1       col14:  first storage operand DEPS(AGEN),2nd itext field required for AGEN
# B2       col15:  2nd storage operand DEPS(AGEN),1st itext field required for AGEN
# X2       col16:  2nd storage operand DEPS(AGEN), 2nd itext field required for AGEN
# R1       col17:  DEPS(EXECUTION), gr/mgr read/write operands, xyz where x=type
#                       of access, y=register action, z=reads compliment or true register
# R2       col18:  same as above for R2
# R3       col19:  same as above for R3
# CC       col20:  condition code
# ECYCS    col21:  execution cycles
# OO       col22:  out of order (Y/N)
# AB       col23:  earliest AGI bypass/early resolution
# AE       col24:  is eligible for agen-time execution Y/N
# NS       col25:  number of agen queue slots
# SS       col26:  superscalar mode (S=can execution with other instructions, etc.)
# GP       col27:  grouping (s=may be in a group, etc.)
# FW       col28:  forwarding
# DS       col29:  disable overlap (B=before, A=after, O=both, D=drain, N=does not)
# SZ       col30:  serialization/recycle/checkpoint-sync/trap
# COM      col31:  comments/verbiage
```

| #0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| #OPC MNEM | VA VARSEL | CLA | EMT UNIT BRCD | IA A1 A2 P1 | P2 | B1 X1 B2 X2 R1 | R2 | R3 | CC ECYCS 00 AB AE NS SS GP FW DS SZ COM | | | | | | | | | | | | | | | | | | | | | | | |
| 0108 TRB | 0 | -------- | MCDi | E FXU nabi | N NA NA 000 | 000 | NA NA NA NA NA NA | 00n | 00n | 00n n 3 | 128 | NO | N 1S | N | S | n | B | S |
| 0201 TPT | 0 | -------- | NRM | RRE FXU nabi | N NA NA 000 | 000 | NA NA NA NA NA NA | 00n | 00n | 00n s 1 | | NO | Y 1S | N | S | n | N | N |
| 0203 TPTE | 0 | -------- | NRM | RRE FXU nabi | N NA NA 000 | 000 | NA NA NA NA NA NA | 00n | 00n | 00n s 1 | | NO | Y 1S | N | S | n | N | N |
| 0204 STFF | 0 | -------- | NRM | RXE DFU nabi | N S F 08D | 08D | B2 X2 NA NA NA NA | 00n | 00n | 00n n 3 | | NO | N 1S | N | S | n | N | N |
| 0205 DMSG | 0 | -------- | NRM | RXF FPU nabi | N FS NA 16Q1 | 000 | B1 NA B2 NA 15n 00n | 11t | n | L/8+1 | | NO | N 1S | N | S | n | N | N |
| 0206 GMSG | 0 | -------- | NRM | RXF FPU nabi | N FS NA 16Q1 | 000 | B1 NA B2 NA 15n 00n | 11t | s | L/8+1 | | NO | N 1S | N | S | n | N | N |
| 0207 STKPF | 0 | -------- | NRM | RXE FPU nabi | N S F 08D | 08D | B2 X2 NA NA NA NA | 00n | 00n | 00n n 3 | | NO | N 1S | N | S | n | N | N |
| 0208 YMGS | 0 | -------- | MCDf | E FXU nabi | N NA NA 000 | 000 | NA NA NA NA 38t 00n | 00n | 00n | 00n s 3 | 12 | NO | N 1S | N | S | n | A | N |
| 0209 HMGS | 0 | -------- | MCDf | E FXU nabi | N NA NA 000 | 000 | NA NA NA NA 38t 00n | 00n | 00n | 00n n 3 | 12 | NO | N 1S | N | S | n | N | N |
| 0302 KFPO | 0 | -------- | MCDf | E FXU nabi | N NA NA 000 | 000 | NA NA NA NA 16n 00n | 00n | 00n | 00n n 3 | 14 | NO | N 1S | N | S | n | A | N |
| 0303 QAM | 0 | -------- | NRM | E FXU nabi | N NA NA 000 | 000 | NA NA NA NA NA NA | 00n | 00n | 00n s 1 | | NO | N 1S | N | S | n | N | N |
| 0307 FALHH | V0 RC10P AAPN24- NRM | | | E FXU nabi | Y NA NA 000 | 000 | NA NA NA NA 00n 00n | 00n | 00n | 00n n 1 | | NO | N 1S | Y | ST | n | N | R | # hardwared - | recycle/serialize afterward when changing addr mode unless in-or-out-of 24-bit mode

| 0307 FALHH | V1 RC10P AAP_24- NRM | | | | | | | | | | | 1 | | | | | | | | | | RS#hardwared - |

| 0307 FALHH | V2 RC10PNAA ---- NRM | | | | | | | | | | | 1 | | | | | | | | | | N #hardwared - no | need to serialize xcond as addressing mode in-or-out-of 24-bit mode

| 0307 FALHH | V3 RC11 -------- MCDf | | | | | | | | | | | 3|66 | | | | | | | | | | S #CR12.1 set |

(tracing enabled) - execute in millicode

| 0309 FALLL | V0 RC10P AAPN24- NRM | | | E FXU nabi | Y NA NA 000 | 000 | NA NA NA NA 00n 00n | 00n | 00n | 00n n 1 | | NO | N 1S | Y | ST | n | N | R | #hardwared - | recycle/serialize afterward when changing addr mode unless in-or-out-of 24-bit mode

| 0309 FALLL | V1 RC10P AAP_24- NRM | | | | | | | | | | | 1 | | | | | | | | | | RS#hardwared - |

| 0309 FALLL | V2 RC10PNAA----- NRM | | | | | | | | | | | 1 | | | | | | | | | | N #hardwared - no | need to serialize xcond as addressing mode is unchanged

FIG. 1B1

| | | | | | | | | | | | | | | | | | | | | |
|---|---|---|---|---|---|---|---|---|---|---|---|---|---|---|---|---|---|---|---|---|
| 0309 FALLL V3 RC11---------MCDf (tracing enabled) - execute in millicode | | | | | | | | | | | | | 3\|66 | | | | | | S #CR12.1 set | |
| 030A FALHL V0 RC10P AAPN24-NRM E FXU nabi Y NA NA 000 NA NA NA 00n 00n 00n n 1 | | | | | | | | | | | | | | i NO N 1S Y ST n N R #hardwared - | | | | | | |
| recycle afterward when changing addr mode unless in-or-out-of 24-bit mode | | | | | | | | | | | | | | | | | | | | |
| 030A FALHL V1 RC10P AAP 24-NRM | | | | | | | | | | | | | 1 | | | | | | RS#hardwared - | |
| recycle/serialize afterward when changing addr mode in-or-out-of 24-bit mode | | | | | | | | | | | | | | | | | | | | |
| 030A FALHL V2 RC10PNAA-----NRM | | | | | | | | | | | | | 1 | | | | | | N #hardwared - no | |
| need to serialize xcond as addressing mode is unchanged | | | | | | | | | | | | | | | | | | | | |
| 030A FALHL V3 RC11---------MCDf (tracing enabled) - execute in millicode | | | | | | | | | | | | | 3\|66 | | | | | | S #CR12.1 set | |
| 03CD TCA 0 ------------- NRM RR FXU nabi N NA NA 000 NA NA NA 00n 00n 00n n 3 | | | | | | | | | | | | | | o A3 N 1S N S of N N | | | | | | |
| 0420 XSM 0 ------------- NRM RR FXU nabi N NA NA 000 NA NA NA 11t 00n 00n s 4 | | | | | | | | | | | | | | o A3 N 1S N Z bf N N | | | | | | |
| 0601 BAP V0 RC00A 24R2N0-NRM RRF FXU UATB Y BT NA 000 R2 NA NA NA 15n 00n r 1 | | | | | | | | | | | | | | i E1 N 2S N Z n N r #24 bit | | | | | | |
| 0601 BAP V1 RC00A 24R2 0-NRM nabi NA 15n r 1 addressing mode, R2 is non-zero | | | | | | | | | | | | | | | | | | | r #24 bit | |
| 0601 BAP V2 RC00A 31R2N0-NRM UATB BT 15n n 1 addressing mode, R2 is zero | | | | | | | | | | | | | | | | | | | N #31 bit | |
| 0601 BAP V3 RC00A 31R2 0-NRM nabi NA 15n n 1 addressing mode, R2 is non-zero | | | | | | | | | | | | | | | | | | | N #31 bit | |
| 0601 BAP V4 RC00A 64R2N0-NRM UATB BT 35n n 1 addressing mode, R2 is zero | | | | | | | | | | | | | | | | | | | N #64 bit | |
| 0601 BAP V5 RC00A 64R2 0-NRM nabi NA 35n n 1 addressing mode, R2 is non-zero | | | | | | | | | | | | | | | | | | | N #64 bit | |
| 0601 BAP V6 RC01---------MCDf nabi NA 00n n 3\|128 enabled - millicoded | | | | | | | | | | | | | | | | | | | N #branch tracing | |
| # END OPTABLE | | | | | | | | | | | | | | | | | | | | |

SYSTEM AND METHOD FOR PROVIDING A COMMON INSTRUCTION TABLE

BACKGROUND OF THE INVENTION

This invention relates generally to an instruction table, and more particularly to a human readable common instruction table.

Throughout microprocessor development, many different teams have a need for a specific form of shorthand instruction reference table. Typically, each team will maintain its own shorthand instruction reference table tailored to the type of information that the department requires. Quite often, there is much overlap between each of these "sub-tables", creating redundant effort (both in the table data itself as well as the code/scripts to parse the table), introducing more points of failure (table errors), and reducing validation of the attribute data. Hence, there is a need for a common instruction table that is both human and machine-readable.

Common instruction tables may be generated by a tool, such as very high speed integrated circuit (VHSIC) hardware description language (VHDL). However, the VHDL tables are not human readable, thereby preventing visual inspection as a means of validation. In addition, the use of non-human readable VHDL tables prevents information from being available at a glance. Another drawback to the use of VHDL tables is that they require the VHDL to be written first, thus preventing their use by designers.

BRIEF SUMMARY OF THE INVENTION

An exemplary embodiment includes a system for providing a common instruction table (CIT). The system includes a storage device and CIT access software for performing a method. The storage device includes a human readable CIT stored as a text file. The CIT includes data specifying an instruction set for a processor. The method performed by the CIT access software includes receiving a request from a first user for all or a subset of the CIT data relating to logic design. The all or a subset of the CIT data relating to logic design is provided to the first user in response to the request from the first user. A request from a second user is received for all or a subset of the CIT data relating to performance analysis. The all or a subset of the CIT data relating to performance analysis is provided to the second user in response to the request from the second user. A request from a third user for all or a subset of the CIT data relating to design verification is received. The all or a subset of the CIT data relating to design verification is provided to the third user in response to the request from the third user. The first user, second user, and third user are provided with the same data at any point of overlap between the CIT data provided to the first user, the second user, and the third user.

Another exemplary embodiment includes a method for providing a CIT. The method includes receiving a request from a first user for all or a subset of a CIT relating to logic design. The CIT is stored as a text file in a storage device and includes data specifying an instruction set for a processor. The all or a subset of the CIT data relating to logic design is provided to the first user in response to the request from the first user. A request from a second user is received for all or a subset of the CIT data relating to performance analysis. The all or a subset of the CIT data relating to performance analysis is provided to the second user in response to the request from the second user. A request from a third user for all or a subset of the CIT data relating to design verification is received. The all or a subset of the CIT data relating to design verification is provided to the third user in response to the request from the third user. The first user, second user, and third user are provided with the same data at any point of overlap between the CIT data provided to the first user, the second user, and the third user.

A further exemplary embodiment includes a computer program product for providing a CIT. The computer program product includes a computer-readable storage medium for storing instructions for executing CIT access software for performing a method. The method includes receiving a request from a first user for all or a subset of a CIT relating to logic design. The CIT is stored as a text file in a storage device and includes data specifying an instruction set for a processor. The all or a subset of the CIT data relating to logic design is provided to the first user in response to the request from the first user. A request from a second user is received for all or a subset of the CIT data relating to performance analysis. The all or a subset of the CIT data relating to performance analysis is provided to the second user in response to the request from the second user. A request from a third user for all or a subset of the CIT data relating to design verification is received. The all or a subset of the CIT data relating to design verification is provided to the third user in response to the request from the third user. The first user, second user, and third user are provided with the same data at any point of overlap between the CIT data provided to the first user, the second user, and the third user.

BRIEF DESCRIPTION OF THE DRAWINGS

Referring now to the drawings wherein like elements are numbered alike in the several FIGURES:

FIG. 1 is an exemplary common instruction table (CIT) that may be implemented in accordance with an exemplary embodiment of the present invention, including FIG. 1A which depicts an exemplary header comments section of the CIT and FIG. 1B which depicts an exemplary instruction and attribute section of the CIT;

DETAILED DESCRIPTION OF EXEMPLARY EMBODIMENTS

An exemplary embodiment of the present invention is a human-readable, common instruction table (CIT), as well as a software tool to access the CIT. Many attributes of a microarchitecture's instruction set can be represented succinctly and uniformly in an "instruction table" (or "opcode table" or "optable"), where each row represents a unique instruction (or "flavor" of a unique instruction) and each column represents a different attribute. The optables's attribute columns are solicited from all intended users, negotiated, and a reasonable-superset is ultimately embodied in the table. Clutter and overlap are kept to a minimum as a great deal of the value-add of the CIT is its utility as a powerful (human-readable) quick reference—consequently many typographical errors and other errors are identified by inspection. Thus, in an exemplary embodiment, the CIT includes information useful to/relating to logic design, performance analysis, and design verification. Having several groups such as, but not limited to, VHDL designers, verification/simulation team and performance team using this common utility (i.e., the CIT), may result in a reduction of the development schedule and an improvement in the integrity of the finished product. Additional groups may also utilize the CIT, including, but not limited to, compiler and assembly language programmers.

Figures 1, 1A:
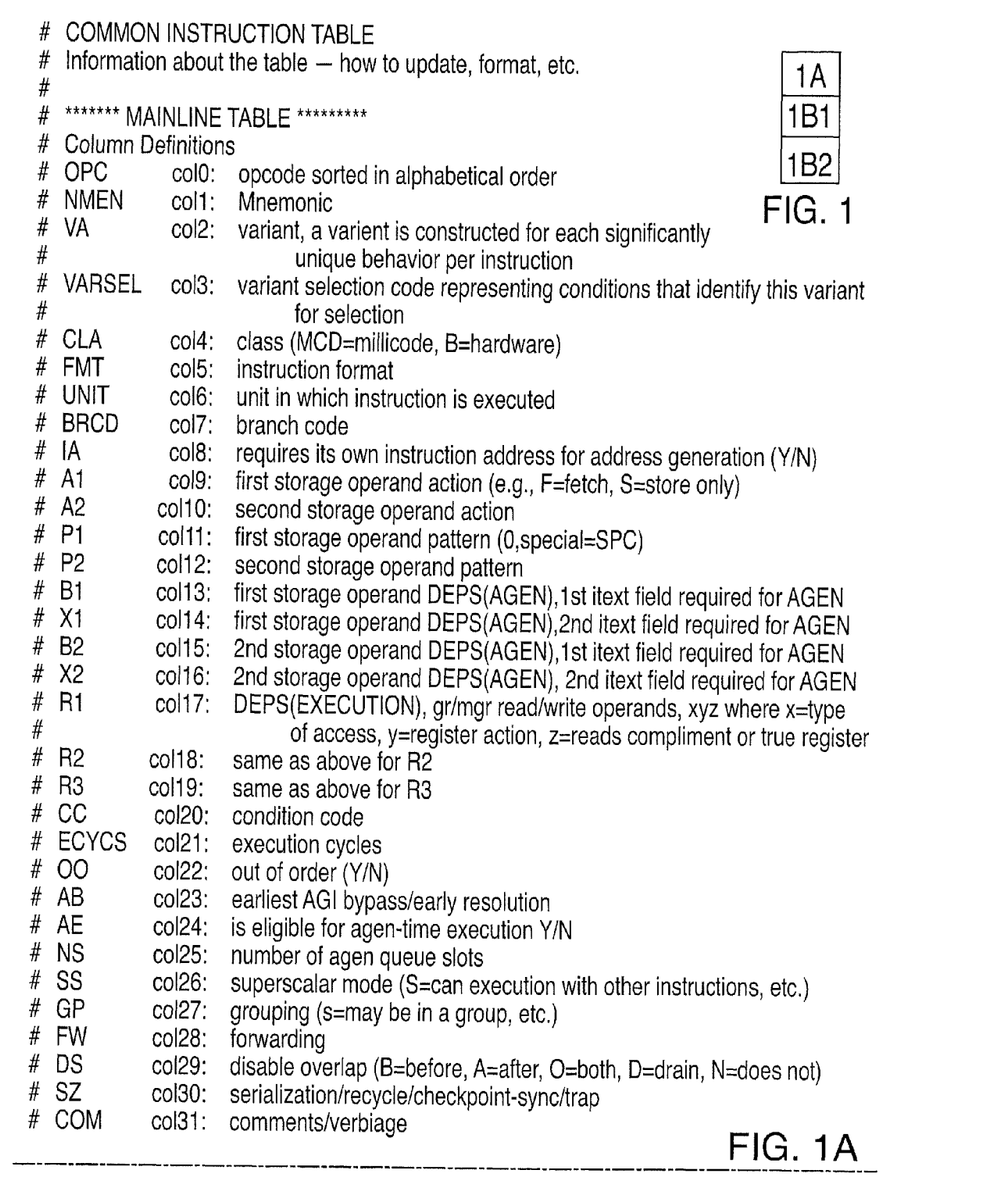
Figure 1B:
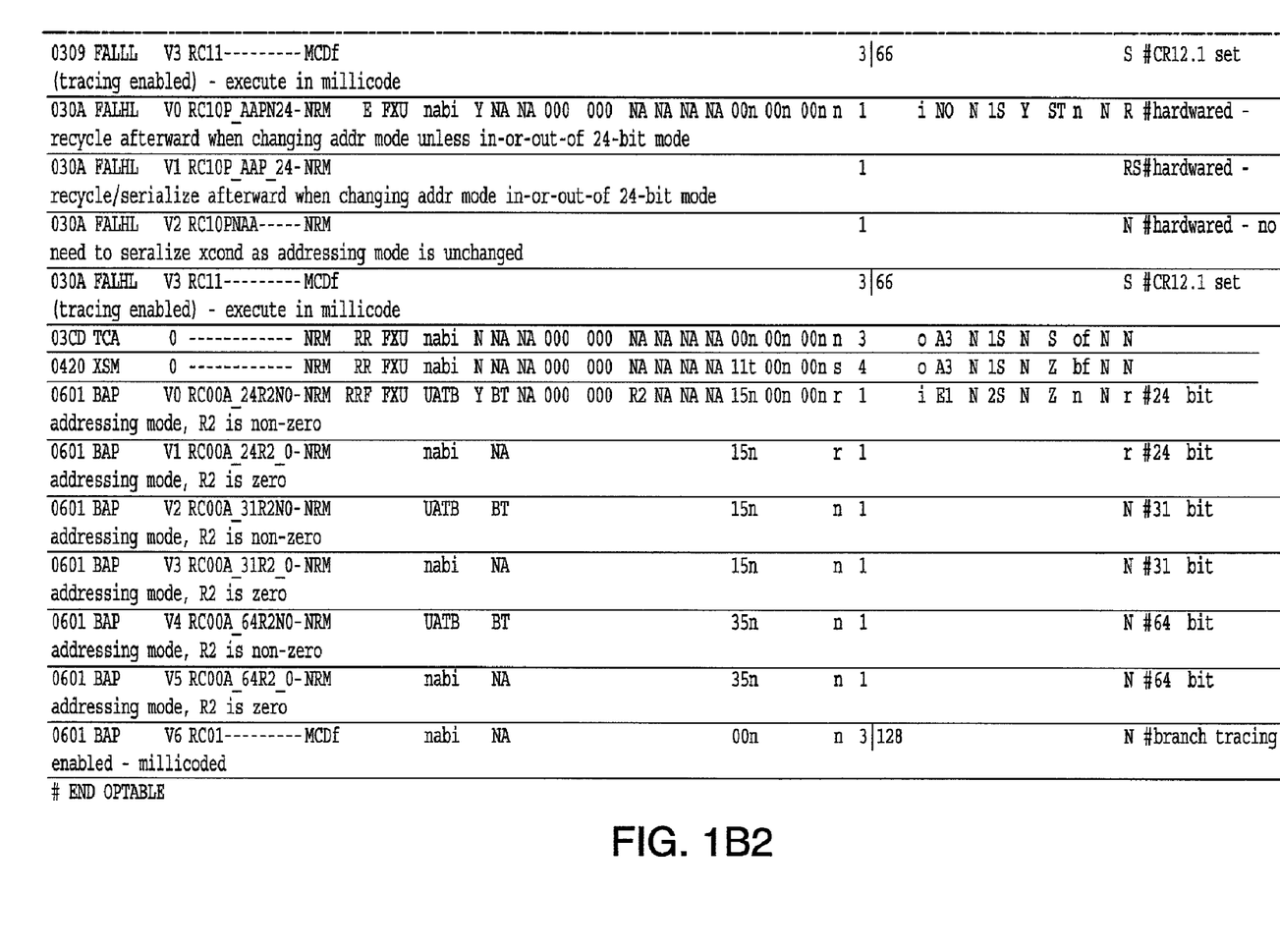

FIG. 1 depicts an exemplary CIT. FIG. 1A includes the header comments that describe the data in the CIT, and FIG. 1B includes the actual instructions and attributes in the exemplary embodiment. As depicted in FIG. 1A, the optable (or CIT) begins with detailed header comments, articulating the attributes embodied in each column and explaining their character code representations. The detailed header comments depicted in FIG. 1A have been abridge, but may also include, but is not limited to, information about how to report errors in the table, the location of a software tool to access the table, information on recent updates to the table, instruction about how to read/interpret data in the table, etc. As depicted in FIG. 1A, column 0 includes the opcode (OPC) associated with the instruction (e.g., sorted in alphabetical order) and column 1 includes the mnemonic (NMEN) associated with the instruction. In the exemplary CIT depicted in FIG. 1, column 2 includes a variant identifier (VA) for the instruction. A variant may be constructed for each significantly unique behavior per instruction. In general, the only time a variant is not created is for mask-dependent conditional branches or traps (i.e., don't want sixteen-times-sixteen variants to say whether these conditional-branches-or-traps are definitively taken/not-taken given all possible combinations outcomes from comparing their itext's mask field against the condition code).

Also depicted in FIG. 1A is a variant selection code attribute (VARSEL) in column 3, representing conditional(s) that identify this variant for selection. In an exemplary embodiment, the variant selection code is thirteen alphanumeric characters wide, 1111222233334, where 1111 is variant selection condition #1, 2222 is variant selection condition #2, 3333 is variant selection condition #3, and 4 is the variant selection "OR" indication. A "–" in any position means "NOT USED". If multiple variant selection conditions are specified they will be ANDed unless the OR indication is present (denoted by a "*"). This system enables automation by a software utility that can now examine the machine and/or instruction text state which is compares against each VARSEL code so that it may identify and select the appropriate variant's CIT information to return to the caller.

The class attribute (CLA) in column 4 indicates the class of the instruction. In an exemplary embodiment, CLA can specify "B" for normal, "MCDf" for millicoded (detected in a fixed point unit "FXU"), "MCDi" for millicoded (detected in IDU), and "AST" for millicode assist. The instruction format attribute (FMT) is specified in column 5, and in an exemplary embodiment is specified as one of: E, RR, RX, S, SI, RS, RSI, RS2, RI, RI2, RI3, RRE, RRF, RRR, SS, SSE, RIE, RIL, RIL2, RSL, RXE, RXF, RXY, RSY, and SIY.

FIG. 1A also includes a unit attribute (UNIT) in column 6 for specifying the unit in which the instruction will be executed. In an exemplary embodiment, the unit attribute includes "FXU"—Fixed Point Unit, "BCD"—Fixed Point Unit (capable of doing Decimal-assist operations), "DFP"—Decimal Floating Point Unit—floating point instruction, "DFX"—Decimal Floating Point Unit—fixed point instruction, "FPUx"—Bin/Hex Floating Point Unit (loads, stores, Integer Multiplies and Divides), "BFPx"—Bin/Hex Floating Point Unit (Binary operations), "BFHx"—Bin/Hex Floating Point Unit (Binary convert to Hexadecimal), "HFPx"—Bin/Hex Floating Point Unit (Hexadecimal operations), and "HFBx"—Bin/Hex Floating Point Unit (Hexadecimal convert to Binary).

In an exemplary embodiment of the CIT, column 7 includes a branch code attribute (BRCD). The BRCD contains the value "nabi" if it is not a branching instruction, or "WXYZ" it is a branch instruction. In an exemplary embodiment: if W="C", then it is a conditional branch, and if W="U" then it is an unconditional branch. In addition, in the location X, "R" means relative branch, "L" relative branch long, and "A" nonrelative (absolute) branch. In the location Y, "T" means statically guessed taken, and "N" means statically guessed not taken. In the location Z, "B: means goes in the BHT, and "N" means does not go into the BHT.

The exemplary CIT depicted in FIG. 1A also includes an instruction address for address generation attribute (IA) in column 8 to indicate whether the instruction requires its own instruction address (IA) for operand address generation (AGEN). The value in IA is "N" for no and "Y" to indicate yes. Column 9 includes a first storage operand action attribute (A1) and may include the value "NA" for no action, "F" for fetch only, "S" for store only, "PF" for prefetch only, "PT" for pretest only, "FS" for fetch then store, "BT" for branch target, "ET" for execute target, "A" for address only, and "AS" for FXU assist—i.e., branch-on-index family, where the AGEN-adder is used to compute R1+R3 for FXU. Column 10 of the exemplary CIT includes an attribute (C2) for indicating the second storage operand action and can include the values described in reference to the C1 attribute.

Column 11 of the exemplary CIT includes a first storage operand pattern (P1) and may include the value "0" for no activity, "SPC" for special instruction, or the value "XXYZ" where "XX" represents a quantity, "Y" represents a rate and "Z" (optional) indicates left-alignment. Column 12 includes a second storage operand pattern attribute (P2), which is similar to P1. Column 13 includes a first storage operand DEPS (AGEN) attribute (B1) which indicates the first itext field required for AGEN (i.e., B1, B2, B4, X2, R1, R2, R3, etc.). Column 14 includes a first storage operand DEPS (AGEN) attribute (X1) which includes the second itext field required for AGEN. Column 15 includes a second storage operand DEPS (AGEN) attribute (B2) which indicates a first itext field required for AGEN and column 16 includes a second storage operand DEPS (AGEN) attribute (X2) which indicates a second itext field required for AGEN.

Column 17 of the exemplary CIT depicted in FIG. 1 includes a R1 attribute for indicating a register being utilized by the instruction for read/write operands. The value of R1 includes "xyz" where x=0 indicates the type of access, y indicates register action and z indicated whether the instruction reads the compliment or the true register. Column 18 includes a R2 attribute similar to the R1 attribute, and column 19 includes a R3 attribute similar to the R1 attribute. Column 20 of the exemplary CIT includes a condition code attribute (CC). The CC attribute includes a "n" to indicate that the instruction neither reads nor sets the condition code, a "r" if it reads the condition code, an "R" if it reads the scratch condition code, an "s" if it sets the condition code, a "S" if it sets the scratch condition code, a "b" if it both reads and sets the condition code, and a "B" if it both reads and sets the scratch condition code.

Other attributes in the exemplary CIT include the execution cycles of the instruction (ECYCS) in column 21, the out of order attribute (OO) in column 22 to indicate if the instruction can be executed out of order, the earliest AGI bypass/early resolution attribute in column 23, the AGEN-time execution attribute (AE) in column 24 to indicate if the instruction is eligible for AGEN-time execution. In addition, the exemplary CIT includes a number of AGEN queue slots attribute (NS) in column 25 to indicate if the instruction requires one or two AGEN queue slots, a superscalar mode attribute (SS) in column 26 to indicate if the instruction can operate with other instructions, a grouping attribute (GP) in column 27 to indicate if the instruction may included in a group of instructions, a forwarding attribute (FW) in column 28 to indicate if the instruction can receive forwarded operands, a disable overlap attribute (DS) in column 29 to indicate if the instruction supports the disabling of overlap and when (B=before, A=after, O=both, D=drain, N=does not), a serialization/recycle/checkpoint-sync/trap attribute (SZ) in column 30, and comments attribute (COM) in column 31.

As depicted in FIG. 1B, the instruction attributes are formatted as a series of rows, where each row represents a unique flavor (or "variant") of a unique instruction of interest to the microarchitecture. Columns are represented by whitespace for enhanced human-readability. The concept of instruction variants, where one instruction has two or more unique behaviors dependent upon either machine state or itext, is readily captured in this format: each unique variant of each instruction is given it own row in the table, and a character code identifying the criteria for selection of a particular variant is included in it attributes. In addition, there is an option for comments to appear at the end of the same row after the attribute data.

To further enhance readability, only the parent row (or first row variant) is fully defined. The subsequent variant rows are primarily blank, save for the attributes that distinguish it from the parent row.

A small suite of common software (referred to herein as CIT access software) accompanies the table—the most important part of which parses the table and presents the attribute data to various development teams through a common interface (e.g., verification, performance). In an exemplary embodiment, the CIT access software is implemented using a text editor. Other software utilities include small scripts to readily identify all rows matching a certain attribute criteria, etc.

Figure 2:
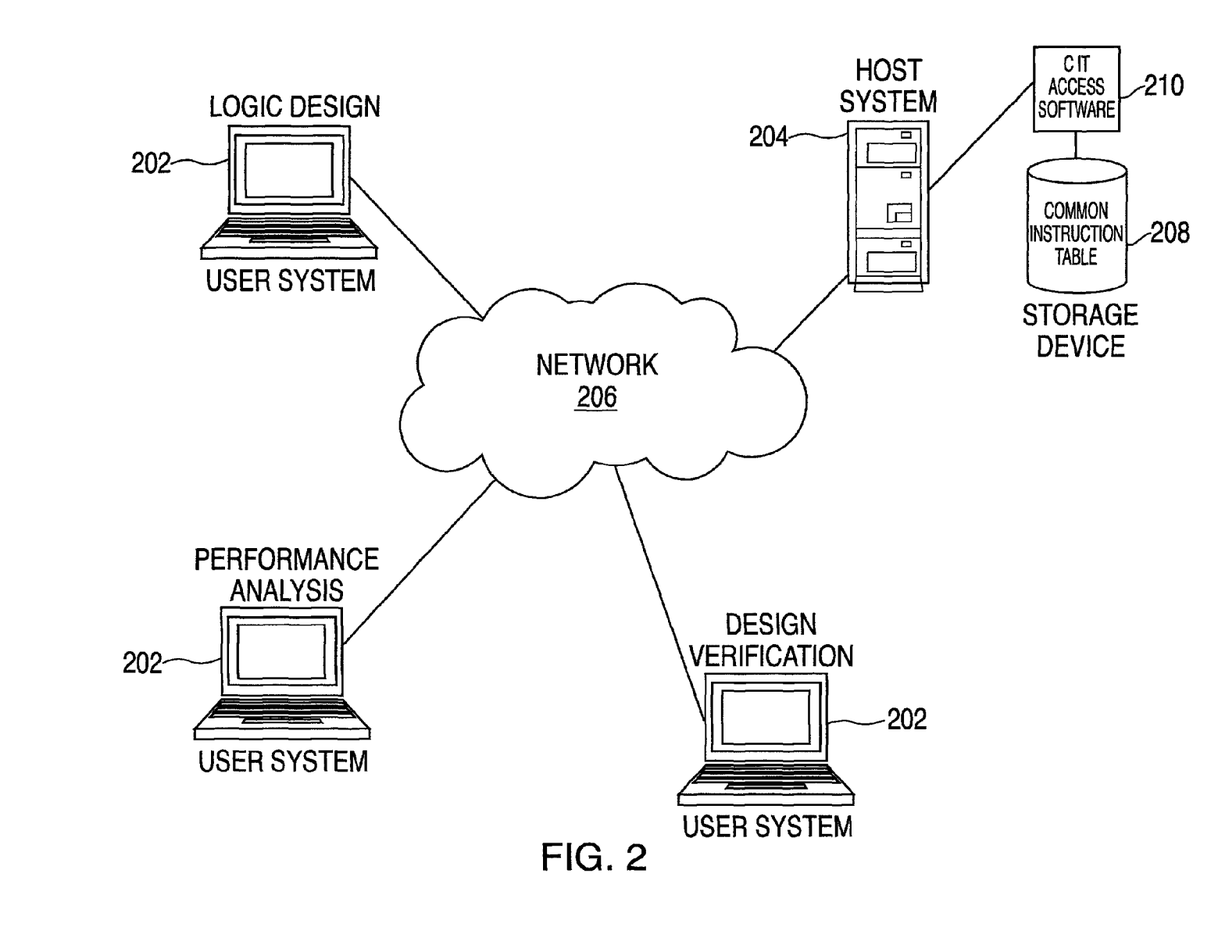
FIG. 2 is a block diagram of a system that may be implemented by an exemplary embodiment of the present invention.

FIG. 2 is a block diagram of an exemplary system for a CIT. The system depicted in FIG. 2 includes one or more user systems 202, through which users at one or more geographic locations may contact the host system 204 to access the CIT via the CIT access software 210. The host system 2204 executes computer instructions for allowing access to the CIT as described herein (referred to herein as "CIT access software 210"). The user systems 202 are coupled to the host system 204 via a network 206. Each user system 202 may be implemented using a general-purpose computer executing a computer program for carrying out the processes described herein. The user systems 202 may be implemented by personal computers and/or host attached terminals. If the user systems 202 are personal computers (or include functionality to execute the processing described herein), the processing described herein may be shared by a user system 202 and the host system 204 (e.g., by providing an applet to the user system). As depicted in FIG. 2, in an exemplary embodiment, the user systems 202 that access the CIT are utilized by various departments to perform logic design, performance analysis, and design verification.

The network 206 may be any type of known network including, but not limited to, a wide area network (WAN), a local area network (LAN), a global network (e.g. Internet), a virtual private network (VPN), and an intranet. The network 206 may be implemented using a wireless network or any kind of physical network implementation. A user system 202 may be coupled to the host system 204 through multiple networks (e.g., intranet and Internet) so that not all user systems 202 are coupled to the host system 204 through the same network. One or more of the user systems 202 and the host system 204 may be connected to the network 206 in a wireless fashion.

The storage device 208 includes the CIT and any other data related to the CIT access software 210. The storage device 208 may be implemented using a variety of devices for storing electronic information. It is understood that the storage device 208 may be implemented using memory contained in the host system 204, a user system 202, or it may be a separate physical device. The storage device 208 is logically addressable as a consolidated data source across a distributed environment that includes a network 206. Information stored in the storage device 208 may be retrieved and manipulated via the host system 204 and/or via one or more user systems. In exemplary embodiments of the present invention, the host system 204 operates as a database server and coordinates access to application data including data stored on the storage device 208.

The host system 204 depicted in FIG. 2 may be implemented using one or more servers operating in response to a computer program stored in a storage medium accessible by the server. The host system 204 may operate as a network server (e.g., a web server) to communicate with the user systems 202. The host system 204 handles sending and receiving information to and from the user system 202 and can perform associated tasks. The host system 204 may also include a firewall to prevent unauthorized access to the host system 204 and enforce any limitations on authorized access. A firewall may be implemented using conventional hardware and/or software as is known in the art.

The host system 204 may also operate as an application server. The host system 204 executes one or more computer programs to access the CIT as described herein. The computer programs are referred to collectively as the CIT access software 210. Processing may be shared by the user system and the host system 204 by providing an application (e.g., java applet) to the user system.

Alternatively, the user system can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 3:
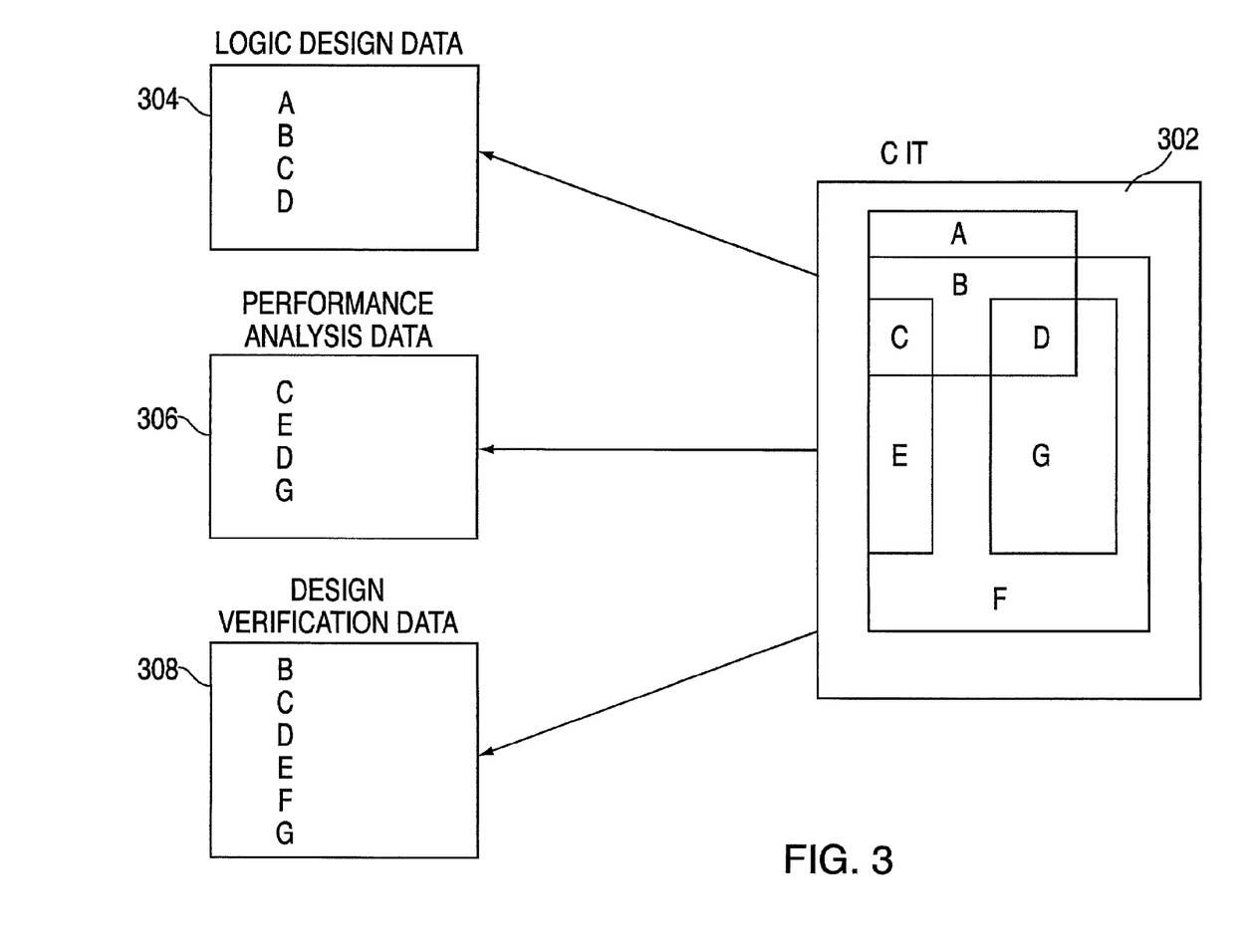
FIG. 3 is a block diagram of exemplary data that may be sourced from the CIT in accordance with exemplary embodiments of the present invention.

FIG. 3 is a block diagram of exemplary data that may be sourced from the CIT in accordance with exemplary embodiments of the present invention. Different users may access the entire table or they may access a subset of the data. Further, a user may request only data relating to a particular functional area (e.g., logic design) or a subset of this data. The user may be interested in only particular instructions and/or attributes in the CIT and request just that subset. FIG. 3 depicts a CIT 302 and three different functional views or subsets of the CIT data. The first view is a logic design data view 304 where only a subset of the rows and columns in the CIT 302 are accessed. The second view is a performance analysis data view 306 where a different subset of the CIT 302 is accessed. The third view is the design verification data view 308 where still another subset of the CIT 302 is accessed. Users looking for all or a subset of the data in the CIT 302 make a request via the CIT access software 210. In response, the CIT access software 210 returns the requested data. In this manner, a single CIT 302 is utilized by multiple departments, or functional groups.

In an exemplary embodiment, the CIT is utilized by teams working on a microprocessor that includes several units such as: an instruction fetch unit (IFU), branch prediction logic (BPL), an instruction decode and dispatch unit (IDU), a load store unit (LSU), a fixed point execution unit (FXU), a floating point execution unit (FPU), and a decimal floating point execution unit (DFU). In this example, all of the teams would be likely to utlize columns: 0 (OPC), 1 (MNEM), 2 (VA), 3 (VARSEL), and 31 (COM). Logic designers, design verification and performance analysis teams working on the IDU and the FXU would be likely to access columns: 4 (CLA), 17 (R1), 18 (R2), 19 (R3), 20 (CC), 21 (ECYCS), 22 (00), 26 (SS), 27 (GP), and 28 (FW). Logic designers, design verification and performance analysis teams working on the IDU would be likely to also access columns: 5 (FMT), 8 (IA), 24 (AE), 25 (NS), and 29 (DS). Column 6 (UNIT) would also be of interest to designers, verification and performance teams working on the IDU, FXU, FPU and DFU. Further, column 7 (BRCD) would likely be of interest to designers, verification and performance teams working on the IFU, BPL, IDU, and FXU. Logic designers, design verification and performance analysis teams working on the IDU and the LSU would be likely to access columns: 9 (A1), 10 (A2), 11 (P1), 12 (P2), 13 (B1), 14 (X1), 15 (B2), and 16 (X2). In addition, column 23 (AB) would likely be of interest to designers, verification and performance teams working on the IDU, LSU, and FXU. Further, column 30 (SZ) would likely be accessed by designers, verification and performance teams working on the FXU. This previous description is just one example of how the CIT table may be accessed, other manners of access are also supported by exemplary embodiments of the present invention.

Technical effects and benefits include a shorter microprocessor development schedule and higher initial quality due to the ability of multiple teams to share a CIT.

The table depicted herein is just an example. There may be many variations of this table described herein without departing from the spirit of the invention. For example, columns and/or rows may be added, deleted or modified. All of these variations are considered a part of the claimed invention.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

IBM® is a registered trademark of International Business Machines Corporation, Armonk, N.Y., U.S.A. Other names used herein may be registered trademarks, trademarks or product names of International Business Machines Corporation or other companies.

The invention claimed is:

1. A system for providing a common instruction table (CIT), the system comprising:
a storage device including a human readable CIT stored as a text file, the CIT including data specifying an instruction set for a processor, the instruction set comprising an instruction, the instruction comprising two or more variants and a layout of the CIT allows differences between the variants to be easily discerned upon visual inspection of the CIT;
CIT access software for performing a method comprising:
receiving a request from a first user for all or a subset of the CIT data relating to logic design;
providing the all or a subset of the CIT data relating to logic design to the first user in response to the request from the first user;
receiving a request from a second user for all or a subset of the CIT data relating to performance analysis;
providing the all or a subset of the CIT data relating to performance analysis to the second user in response to the request from the second user;
receiving a request from a third user for all or a subset of the CIT data relating to design verification; and
providing the all or a subset of the CIT data relating to design verification to the third user in response to the request from the third user;
wherein the first user, second user, and third user are provided with the same data at any point of overlap between the CIT data provided to the first user, the second user, and the third user.

2. The system of claim 1 wherein the providing includes one or more of performing text matching and utilizing column identification techniques.

3. The system of claim 1 wherein the CIT data further includes verbiage about one or more instructions in the instruction set.

4. The system of claim 1 wherein the CIT comprises a row for each instruction in the instruction set and a plurality of columns specifying attributes associated with the instructions.

5. The system of claim 4 wherein the CIT further comprises header comments describing the attributes in the columns.

6. The system of claim 4 wherein the attributes in the columns represent a subset of all attributes associated with the instructions.

7. A method for providing a common instruction table (CIT), the method comprising:

receiving a request from a first user for all or a subset of a CIT relating to logic design, the CIT stored as a text file in a storage device and the CIT including data specifying an instruction set for a processor, the instruction set comprising an instruction, the instruction comprising two or more variants and a layout of the CIT allows differences between the variants to be easily discerned upon visual inspection of the CIT;

providing the all or a subset of the CIT data relating to logic design to the first user in response to the request from the first user;

receiving a request from a second user for all or a subset of the CIT data relating to performance analysis;

providing the all or a subset of the CIT data relating to performance analysis to the second user in response to the request from the second user;

receiving a request from a third user for all or a subset of the CIT data relating to design verification; and providing the all or a subset of the CIT data relating to design verification to the third user in response to the request from the third user;

wherein the first user, second user, and third user are provided with the same data at any point of overlap between the CIT data provided to the first user, the second user, and the third user.

8. The method of claim 7 wherein the providing includes one or more of performing text matching and utilizing column identification techniques.

9. The method of claim 7 wherein the CIT further includes verbiage about one or more instructions in the instruction set.

10. The method of claim 7 wherein the CIT comprises a row for each instruction in the instruction set and a plurality of columns specifying attributes associated with the instructions.

11. The method of claim 10 wherein the CIT further comprises header comments describing the attributes in the columns.

12. The method of claim 10 wherein the attributes in the columns represent a subset of all attributes associated with the instructions.

13. A computer program product for providing a common instruction table (CIT), the computer program product comprising:

a computer-readable storage device storing instructions executable by a computer, the instructions for performing a method comprising:

receiving a request from a first user for all or a subset of a CIT relating to logic design, the CIT stored as a text file in a storage device and the CIT including data specifying an instruction set for a processor, the instruction set comprising an instruction, the instruction comprising two or more variants and a layout of the CIT allows differences between the variants to be easily discerned upon visual inspection of the CIT;

providing the all or a subset of the CIT data relating to logic design to the first user in response to the request from the first user;

receiving a request from a second user for all or a subset of the CIT data relating to performance analysis;

providing the all or a subset of the CIT data relating to performance analysis to the second user in response to the request from the second user;

receiving a request from a third user for all or a subset of the CIT data relating to design verification; and providing the all or a subset of the CIT data relating to design verification to the third user in response to the request from the third user;

wherein the first user, second user, and third user are provided with the same data at any point of overlap between the CIT data provided to the first user, the second user, and the third user.

14. The computer program product of claim 13 wherein the providing includes one or more of performing text matching and utilizing column identification techniques.

15. The computer program product of claim 13 wherein the CIT further includes verbiage about one or more instructions in the instruction set.

16. The computer program product of claim 13 wherein the CIT comprises a row for each instruction in the instruction set and a plurality of columns specifying attributes associated with the instructions.

17. The computer program product of claim 16 wherein the CIT further comprises header comments describing the attributes in the columns.

18. The computer program product of claim 16 wherein the attributes in the columns represent a subset of all attributes associated with the instructions.

* * * * *